(12) United States Patent
Shoji et al.

(10) Patent No.: US 8,564,807 B2
(45) Date of Patent: Oct. 22, 2013

(54) PRINTING CONTROL PROGRAM AND PROGRAM RECORDING MEDIA

(75) Inventors: Koichiro Shoji, Kanagawa (JP); Takashi Nozaki, Kanagawa (JP)

(73) Assignee: Science Park Corporation, Zama-shi (JP)

( * ) Notice: Subject to any disclaimer, the term of this patent is extended or adjusted under 35 U.S.C. 154(b) by 1162 days.

(21) Appl. No.: 11/910,119

(22) PCT Filed: Mar. 29, 2006

(86) PCT No.: PCT/JP2006/306579
§ 371 (c)(1),
(2), (4) Date: Jun. 17, 2009

(87) PCT Pub. No.: WO2006/104218
PCT Pub. Date: Oct. 5, 2006

(65) Prior Publication Data
US 2009/0316181 A1    Dec. 24, 2009

(30) Foreign Application Priority Data
Mar. 29, 2005   (JP) .................................. 2005-95974

(51) Int. Cl.
*G06F 15/00*    (2006.01)

(52) U.S. Cl.
USPC .......... 358/1.15; 358/1.1; 358/1.13; 358/1.14

(58) Field of Classification Search
USPC .................................. 358/1.1, 1.15, 1.14, 1.9
See application file for complete search history.

(56) References Cited

U.S. PATENT DOCUMENTS

| 7,701,597 B2 * | 4/2010 | Machiyama | 358/1.14 |
| 2004/0130743 A1 * | 7/2004 | Nozato | 358/1.14 |

FOREIGN PATENT DOCUMENTS

| JP | 8278860 A | 10/1996 |
| JP | 2004178249 A | 6/2004 |

OTHER PUBLICATIONS

International Search Report of PCT/JP2006/306579, date of mailing Jul. 11, 2006.

* cited by examiner

*Primary Examiner* — King Poon
*Assistant Examiner* — Iriana Cruz
(74) *Attorney, Agent, or Firm* — Westerman, Hattori, Daniels & Adrian, LLP

(57) ABSTRACT

[Task] When data is printed to a printing device from a computer, the printing is approved or not approved according to the data contents.
[Solution] A first control filter 23, which detects printing data output from a spooler 10, halts the printing task temporarily, and replicates the printing data, and a viewable image driver 20 which uses replicated printing data to create an image file, are provided. The image file is transmitted over a network 2 to a manager, and the manager views the image file and decides whether to perform printing on the printing device 4, and transmits a notification signal to this effect to the first control filter 23. The first control filter 23 performs printing control according to the notification signal from the manager.

4 Claims, 8 Drawing Sheets

US 8,564,807 B2

PRINTING CONTROL PROGRAM AND PROGRAM RECORDING MEDIA

TECHNICAL FIELD

The present invention relates to a printing control program to control printing from an electronic computer to a printing device, and to program recording media. More particularly, the present invention relates to a printing control program and program recording media to control printing, when an electronic computer prints to a printing device or to a composite device having printing functions, which is connected to the electronic computer either directly or via a network, and when a manager has reviewed data to be printed and has transmitted a notification signal as to whether to permit printing, by the electronic computer according to the notification signal.

BACKGROUND

In recent years there has been expanding use of network systems in which a plurality of electronic computers are interconnected. Companies in general have come to use such network systems in business operations. Each company is engaged in efforts to manage the handling and flow of business data. When important data within a company is printed and then is leaked outside the company, such consequences as lowered public standing of the company, influencing the company's stock price, result. Particularly in industries in which the personal information of customers is handled, there are serious problems of loss of customer trust; in light of the possibility of carelessness or illicit operations on the part of employees, external intruders or others, it is vital that the type of files being printed from electronic computers be monitored and managed.

The following technology has been disclosed as means of controlling printing to printing devices from electronic computers. In Patent Document 1, when a printer is accessed from an application program operating on a computer and printing is performed, the act of printing is detected by a common interface driver, and control is executed to permit or forbid printing by referencing the file and data which is to be printed.

More specifically, when a printer is accessed by an application program, the computer is controlled and the a spooler of the operating system which is running the application program operates. Access is detected through an event which occurs when this spooler operates. The common interface driver controls data output to the printer according to control conditions registered in advance in a control condition database.

Patent Document 1: International Patent Publication No. 2004/077287

DISCLOSURE OF THE INVENTION

In Patent Document 1, the printing control is performed according to conditions registered in advance in a computer. The control to review the contents of a file to be printed and to decide whether to print the file is not disclosed.

This invention was devised in light of the above-described circumstances of the prior art, and attains the following objects.

An object of this invention is to provide a printing control program and program recording media, which, at the time of accessing from a computer of a printing device to print electronic data, a file, or other user data, transmits the contents of the data to be printed to a manager or to a managing computer, and which performs printing control according to the response.

This invention adopts the following means in order to attain the above objects.

This invention provides a printing control program, controlled by an operating system (OS), which, when printing data is output from a computer (3) to a printing device (4), causes the computer to execute control thereof.

More specifically, a printing control program of this invention controls either print commands and output data output from an application program (11) operating on the operating system to the printing device (4) in order to perform printing, or the printing data output to the printing device (4).

The printing control program of a first invention comprises a monitoring and control filter (22) for detecting a print command and output data output from an application program (11) operating on the operating system to the printing device (4) in order to perform printing and for controlling the output data; and a spooler (10) for processing the output data and creating the printing data, to temporarily save the created printing data in a storage medium, and for outputting the data to the printing device (4).

The printing control program of the first invention is characterized in that:

the monitoring and control filter (22) detects the print command, temporarily halts the print command and the output data, and replicates and transmits to the spooler (10) the output data;

the spooler (10) processes the replicated output data and creates the printing data;

a viewable image driver (20) for creating a file which can be displayed on a screen uses the printing data output from the spooler (10) to create a file (21) which can be displayed on a screen;

transmission means (24, 25) for transmission to a network (2) transmit the file (21) to the network (2);

the monitoring and control filter (22) receives a notification signal transmitted from a manager who receives the file (21) via the network (2), views the file (21), and judges whether or not to perform printing using the printing device (4); and when the notification signal is a printing permission signal, the monitoring and control filter (22) cancels the temporary halt to perform printing, but when the notification signal is a printing prohibition signal, the monitoring and control filter (22) erases the temporarily halted print command and the output data to interrupt printing.

The printing control program of a second invention comprises a spooler (10), which processes output data output, in order to perform printing on the printing device (4), from the application program (11) operating on the operating system, creates the printing data, and temporarily stores the created printing data to storage media, and a first control filter (23), to control the printing data.

The printing control program of the second invention is characterized in that:

the first control filter (23) detects the printing data output from the spooler (10), temporarily halts the printing task, and replicates the printing data;

a viewable image driver (20) for creating a file which can be displayed on a screen uses the replicated printing data to create a file (21) which can be displayed on a screen;

transmission means (24, 25) for transmission to a network (2) transmit the file (21) to the network (2);

the first control filter (23) receives a notification signal transmitted from a manager who receives the file (21) via the network (2), views the file (21), and judges whether or not to perform printing using the printing device (4); and when the notification signal is a printing permission signal, the first control filter (23) cancels the temporary halt to perform printing, but when the notification signal is a printing prohibition signal, the first control filter (23) erases the temporarily halted printing data to interrupt printing.

The printing control program of a third invention comprises a monitoring and control filter (22) for detecting print commands and output data, output from an application program (11) operating on the operating system in order to perform printing to the printing device (4); a spooler (10) for processing the output data and creating the printing data and temporarily saving the created printing data in a storage medium and outputting the data to the printing device (4); and a first control filter (23) for controlling the printing data.

The printing control program of the third invention is characterized in that:

the monitoring and control filter (22) detects the print commands;

the spooler (10) processes the output data, creates the printing data, and temporarily stores the created printing data in a storage medium;

the first control filter (23) detects the printing data output from the spooler (10), temporarily halts the printing task, and replicates the printing data;

a viewable image driver (20) for creating a file which can be displayed on a screen uses the replicated printing data to create a file (21) which can be displayed on a screen;

transmission means (24, 25) for transmission to a network (2) transmit the file (21) to the network (2);

the monitoring and control filter (22) receives a notification signal transmitted from a manager who receives the file (21) via the network (2), views the file (21), and judges whether or not to perform printing using the printing device (4);

the monitoring and control filter (22) transmits the notification signal to the first control filter (23); and, when the notification signal is a printing permission signal, the first control filter (23) cancels the temporary halt to perform printing, but when the notification signal is a printing prohibition signal, the first control filter (23) erases the temporarily halted printing data interrupt printing.

The printing control program of a fourth invention comprises a monitoring and control filter (22) which detects print commands and output data, output from an application program (11) operating on the operating system in order to perform printing to the printing device (4), and controls the output data, and which operates in a user mode of the operating system (OS); a spooler (10) for processing the output data and creating the printing data, to temporarily save the created printing data in a storage medium, and for outputting the data to the printing device (4); and a common interface driver (107) which operates in kernel mode and is capable of executing all commands of the operating system (OS), and which exchanges data with a plurality of other device drivers, to provide conditions for controlling the output data to the monitoring and control filter (22).

The printing control program of the fourth invention is characterized in that:

the monitoring and control filter (22) detects the print commands, confirms the conditions obtained from the common interface driver (107), and, when the conditions apply to the print command, controls the print command and the output data according to the conditions, but when the conditions do not apply to the print command, temporarily halts the print command and the output data, replicates the output data, and transmits the data to the spooler (10);

the spooler (10) processes the replicated output data, and creates the printing data;

a viewable image driver (20) for creating a file which can be displayed on a screen uses the printing data output from the spooler (10) to create a file (21) which can be displayed on a screen;

transmission means (24, 25) for transmission to a network (2) transmit the file (21) to the network (2);

the monitoring and control filter (22) receives a notification signal transmitted from a manager who receives the file (21) via the network (2), views the file (21), and judges whether or not to perform printing using the printing device (4); and, when the notification signal is a printing permission signal, the monitoring and control filter (22) cancels the temporary halt to perform printing, but when the notification signal is a printing prohibition signal, the monitoring and control filter (22) erases the temporarily halted print command and output data to interrupt printing.

The printing control program of a fifth invention comprises a monitoring and control filter (22) which detects print commands and output data, output from an application program (11) operating on the operating system in order to perform printing to the printing device (4), and controls the output data, and which operates in a user mode of the operating system (OS); a spooler (10) for processing the output data and creating the printing data, to temporarily save the created printing data in a storage medium, and to output the data to the printing device (4); a common interface driver (107) which operates in kernel mode and is capable of executing all commands of the operating system (OS), and which exchanges data with a plurality of other device drivers, to provide conditions for controlling the output data to the monitoring and control filter (22); and a first control filter (23), inserted after the spooler (10), to control the printing data output from the spooler (10).

The printing control program of the fifth invention is characterized in that:

the monitoring and control filter (22) detects the print commands, and confirms the conditions obtained from the common interface driver (107);

when the conditions apply to the print command, the monitoring and control filter (22) controls the print command and the output data according to the conditions, but when the conditions do not apply to the print command, the monitoring and control filter (22) transmits an announcement signal to the first control filter (23);

the spooler (10) processes the replicated output data, creates the printing data, and temporarily stores the created printing data in a storage medium;

the first control filter (23) receives the announcement signal, detects the printing data output from the spooler (10), temporarily halts the printing task, and replicates the printing data;

a viewable image driver (20) for create a file which can be displayed on a screen uses the replicated printing data to create a file (21) which can be displayed on a screen;

transmission means (24, 25) for transmission to a network (2) transmit the file (21) to the network (2);

the first control filter (23) receives a notification signal transmitted from a manager who receives the file (21) via the network (2), views the file (21), and judges whether or not to perform printing using the printing device (4); and, when the notification signal is a printing permission signal, the first control filter (23) cancels the temporary halt to perform printing, but when the notification signal is a printing prohibition signal, the first control filter (23) erases the temporarily halted printing data to interrupt printing.

The printing control program of a sixth invention is the printing control program of the fifth invention, characterized in that the monitoring and control filter (22) receives the notification signal transmitted from the manager, and that the monitoring and control filter (22) transmits the notification signal to the first control filter (23).

The printing control program of a seventh invention comprises a monitoring and control filter (22) which detects print commands and output data, output from an application program (11) operating on the operating system in order to perform printing to the printing device (4), and controls the output data, and which operates in a user mode of the operating system (OS); a spooler (10) for processing the output data and creating the printing data, to temporarily save the created printing data in a storage medium, and to output the data to the printing device (4); a common interface driver (107) which operates in kernel mode and is capable of executing all commands of the operating system (OS), and which exchanges data with a plurality of other device drivers, to provide conditions for controlling the output data to the monitoring and control filter (22); and a second control filter (141), which operates in the kernel mode and is inserted before the printer device driver (18) which controls the printing device (4), to control the printing data sent from the spooler (10) to the printing device (4).

The printing control program of the seventh invention is characterized in that:

the monitoring and control filter (22) detects the print commands, and conforms the conditions obtained from the common interface driver (107);

when the conditions apply to the print command, the control is performed, according to the conditions, by the monitoring and control filter (22) or by the second control filter (141);

when the conditions do not apply to the print command, the monitoring and control filter (22) temporarily halts the print command and the output data, replicates the output data, and transmits the data to the spooler (10);

the spooler (10) processes the replicated output data, and creates the printing data;

a viewable image driver (20) for creating a file which can be displayed on a screen uses the printing data output from the spooler (10) to create a file (21) which can be displayed on a screen;

transmission means (24, 25) for transmission to a network (2) transmit the file (21) to the network (2);

the monitoring and control filter (22) receives a notification signal transmitted from a manager who receives the file (21) via the network (2), views the file (21), and judges whether or not to perform printing using the printing device (4); and, when the notification signal is a printing permission signal, the monitoring and control filter (22) cancels the temporary halt to perform printing, but when the notification signal is a printing prohibition signal, the monitoring and control filter (22) erases the temporarily halted print command and printing data to interrupt printing.

The printing control program of an eighth invention comprises a monitoring and control filter (22) which detects print commands and output data, output from an application program (11) operating on the operating system in order to perform printing to the printing device (4), and which operates in a user mode of the operating system (OS); a spooler (10) for processing the output data and creating the printing data, to temporarily save the created printing data in a storage medium, and to output the data to the printing device (4); a common interface driver (107) which operates in kernel mode and is capable of executing all commands of the operating system (OS), and which exchanges data with a plurality of other device drivers, to provide conditions for controlling the output data to the monitoring and control filter (22); a second control filter (141) which operates in the kernel mode, and is inserted before the printer device driver (18) which controls the printing device (4), to control the printing data sent from the spooler (10) to the printing device (4); and, a first control filter (23), inserted after the spooler (10), to control the printing data output from the spooler (10).

The printing control program of the eighth invention is characterized in that:

the monitoring and control filter (22) detects the print commands, and confirms the conditions obtained from the common interface driver (107);

when the conditions apply to the print command, the control is performed, according to the conditions, by the monitoring and control filter (22) or by the second control filter (141);

when the conditions do not apply to the print command, the first control filter (23) detects the printing data output from the spooler (10), temporarily halts the printing task, and replicates the printing data;

a viewable image driver (20) for creating a file which can be displayed on a screen uses the replicated printing data to create a file (21) which can be displayed on a screen;

transmission means (24, 25) for transmission to a network (2) transmit the file (21) to the network (2);

the first control filter (23) receives a notification signal transmitted from a manager who receives the file (21) via the network (2), views the file (21), and judges whether or not to perform printing using the printing device (4); and, when the notification signal is a printing permission signal, the first control filter (23) cancels the temporary halt to perform printing, but when the notification signal is a printing prohibition signal, the first control filter (23) erases the temporarily halted print command and printing data to interrupt printing.

The printing control program of a ninth invention is the printing control program of the eighth invention, characterized in that the monitoring and control filter (22) receives the notification signal transmitted from the manager, and that the monitoring and control filter (22) transmits the notification signal to the first control filter (23).

The printing control program of a tenth invention is the printing control program selected from any one among the fourth through the ninth inventions, characterized in that:

the common interface driver (107) comprises: an application interface portion (117) which is an interface with the application program (11); a printer output monitoring driver portion (142) which confirms the control conditions for controlling printing data and transmits a command for the control to the monitoring and control filter (22); and data input/output portions (119, 120, 130) which access the storage device and acquire the control conditions, and pass the conditions to the printer output monitoring driver portion (142), the monitoring and control filter (22), which is inserted before the spooler (10), detects the print command through an event which occurs when the spooler (10) operates, and passes the detected print command to the printer output monitoring driver portion (142) via the application interface portion (117);

the printer output monitoring driver portion (142) receives the print command, and transmits a control command for the print command to the monitoring and control filter (22); and, the monitoring and control filter (22) controls the printing data using the control conditions according to the control command.

The printing control program of an eleventh invention is the printing control program selected from any one of the seventh through the ninth inventions, characterized in that the printer output monitoring driver portion (142) receives the print command and transmits a control command for the print command to the second control filter (141), and the second control filter (141) controls the printing data using the control conditions according to the control command.

The recording media on which is recorded a printing control program of a twelfth invention is recording media on which is recorded the printing control program selected from any one among the first through the eleventh inventions.

By means of this invention, the following advantageous results are obtained.

When electronic data, a file, or other user data from an application program operating on a computer is to be printed to a printing device, this invention enables the contents of the data to be printed to be transmitted to a manager or to a managing computer, so that a manager can review and ascertain the content, and printing of the data can be approved or not approved.

BEST MODE FOR CARRYING OUT THE INVENTION

Below, a first aspect of the invention is explained. In the first aspect of the invention, a manager confirms the contents of printing data which is to be printed by a client, and decides to approve or not to approve printing of the printing data, and the client computer being operated by the client executes control of printing according to this decision. The printing control system of this first aspect of the invention provides a system by means of which, when electronic data, a file, or other user data from a client computer being operated by a client is to be printed on a printing device, a manager reviews the printing data and approves or does not approve the printing.

When printing user data from a client computer, the user data or the printing data for transmission to the printing device is transmitted to a manager computer. On the display of the manager computer, the manager reviews printing data requested by the client, and transmits a notification signal, indicating either approval or non-approval, from the manager computer to the client computer. The client computer receives this notification signal, and proceeds with printing or interrupts printing, according to the notification signal.

The printing control system of the first aspect of the invention comprises a server which relays communication between the client computer and the manager computer. The server comprises a database which stores printing data requested by the client computer; this database can be accessed from the manager computer.

Figure 1:
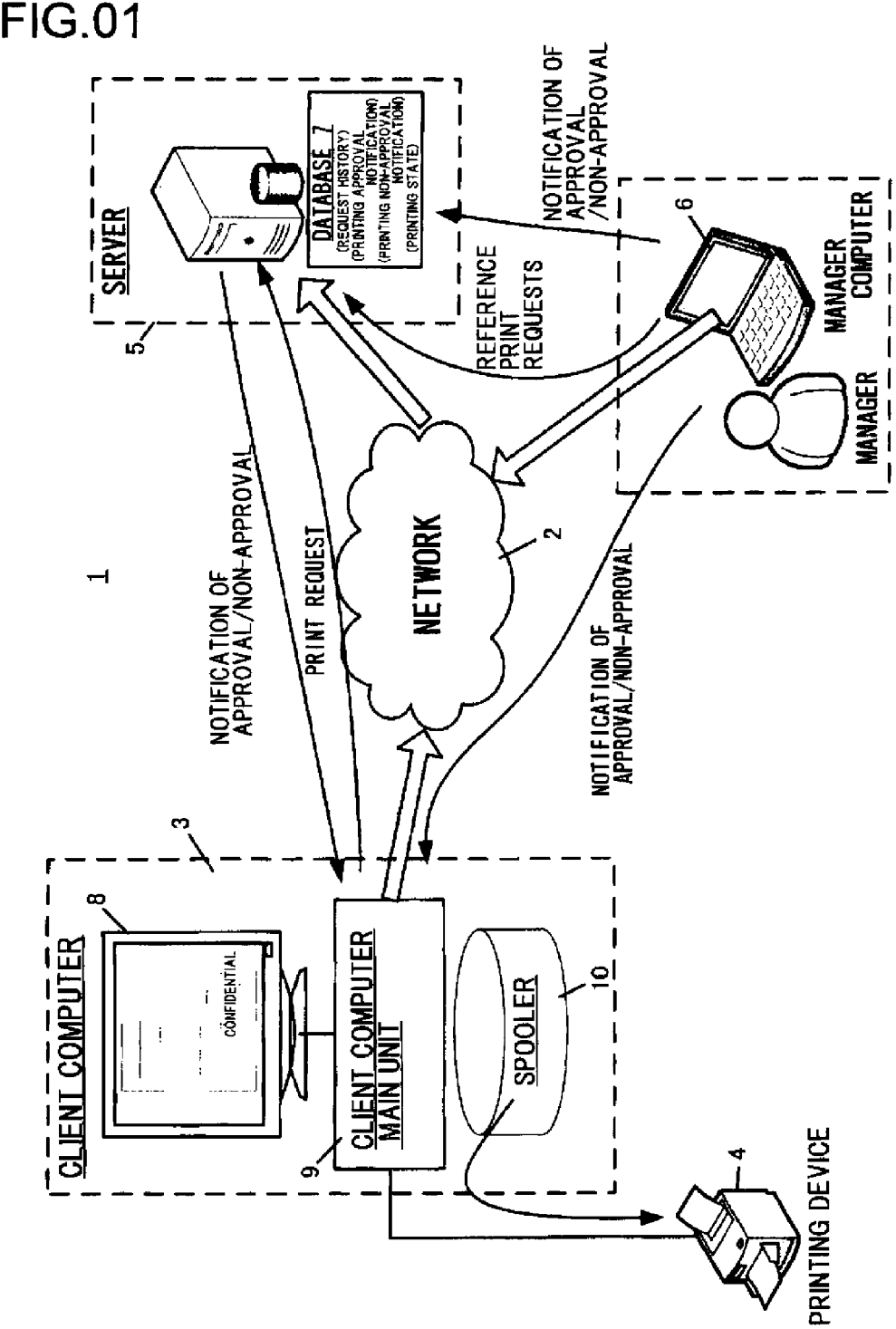
FIG. 1 is a functional block diagram showing in summary the printing control system 1 of a first aspect of the invention.

FIG. 1 shows in summary the printing control system 1 of the first aspect of the invention. The printing control system 1 comprises a client computer 3 connected to a network 2, a printing device 4, a server 5, and a manager computer 6. The client computer 3 is a computer operated by a client to perform tasks, and is used to print files during tasks or files stored in a storage device (not shown) of the client computer 3. Here "files" may mean image data, document files, text data, program code, or other electronic data which can be printed onto paper media.

The printing device 4 is sued to print printing data transmitted from the client computer 3 onto paper or other media. Data for which printing has been requested by the client computer 3 is formatted for a database and supplied to the database 7 of the server 5. The database 7 stores a history of printing requests from the client computer 3, including a history of requests, the printing content, the decision of the manager, and similar. The database 7 is stored in a storage device (not shown) of the server 5. The server 5 can be accessed and the contents of the database 7 can be acquired and reviewed from the manager computer 6.

The manager computer 6 is a computer which is operated by a manager to perform tasks. The network 2 connects the client computer 3, server 5, and manager computer 6, and is used for data communication therebetween. The network 2 may be any form of communication network, such as the Internet, a LAN (Local Area Network), a wireless communication network, or similar. It is particularly preferable that the network 2 be the Internet.

The client computer 3 comprises a client display 8, client computer main unit 9, input device (not shown), storage device (not shown), and similar. The client computer 3 operates under the control of an operating system. It is particularly preferable that the operating system be a Microsoft Windows (a registered trademark) operating system.

Various application programs run on this operating system. Print commands can be issued to perform printing from these application programs, or from the operating system. When performing printing, the operating system receives such a print command, and uses services or similar incorporated within the operating system to convert the data into a printable format, and finally to transmit the data to the printing device. These services or similar may include a spooler 10, language monitor, port monitor, device driver for the printing device (explained below), and similar.

(Flow of Printing)

Figure 2:
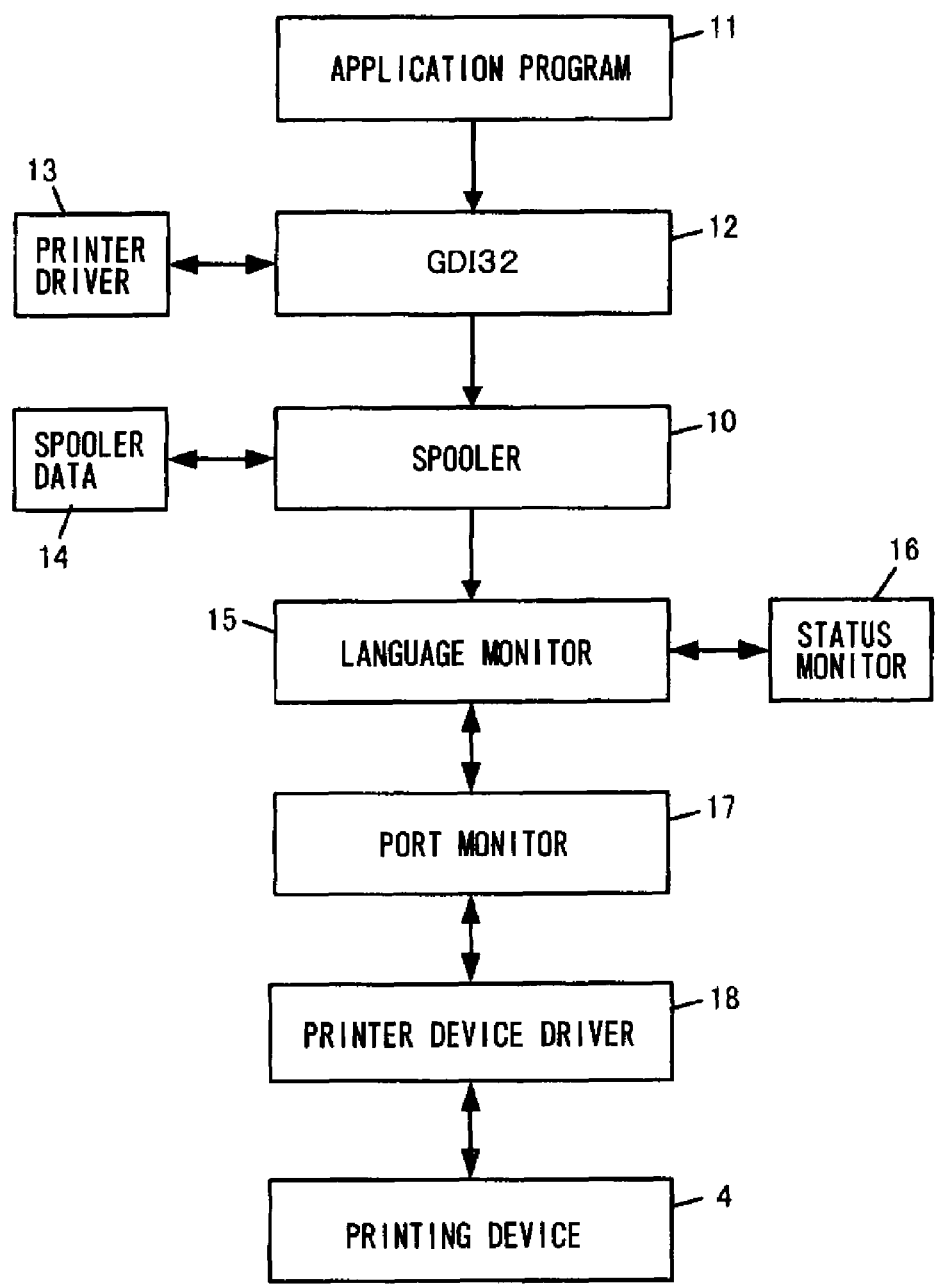
FIG. 2 is a functional block diagram showing the interrelation between services related to printing of an operating system.

Here, in order to facilitate an explanation of the first aspect of the invention, a printing procedure which is technology of the prior art is explained, referring to FIG. 2. The operating system in this example is a Windows (a registered trademark) operating system. FIG. 2 is a block diagram showing interconnections between services in this operating system, used when printing data from an application program 11 to a printing device 4.

First, a summary explanation of the functions of the various portions shown in FIG. 2 is given. The application program 11 is a program which runs on the operating system. GDI32 (12) is a service which is provided as standard by the operating system, and is used to provide an interface to printers, displays, and other output devices. GDI32 (12) has functions which use data provided by application programs, and which convert the data into printing data in a printable format and output the data.

The printer driver 13 is a program which provides information relating to functions specific to the model and type of the printing device 4. The printer driver 13 is normally supplied by the manufacturer providing the printing device 4 together with the printing device 4. The spooler 10 is a service which temporarily stores printing data in computer memory, as spooler data 14, and which outputs the data to the printing device 4. The language monitor 15 is a service which receives the spooler data 14 from the spooler 10 and converts into a printable format a little at a time, for example, one page at a time, and transmits the data to the printing device 4.

The language monitor 15 has functions for monitoring the state of the printing device 4, such as paper jams, toner depletion and similar, and for providing this information via the status monitor 16 to a higher-level service. The port monitor 17 monitors and controls the state of the port to which the printing device 4 is connected. The printer device driver 18 is a device driver which directly controls the printing device 4.

A user performs printing by pressing a print button displayed on the screen of the application program 11, or by directly entering a command to perform printing from a command line. At this time, a print command is sent, and the application program 11 calls the GDI32 (12) and passes data for printing. The GDI32 (12) calls the printer driver 13, receives information specific to the printing device 4, and outputs printing data in a printable format.

This printing data is transmitted to the spooler 10. The spooler 10 stores the printing data on a hard disk as spooler data 14, and passes the spooler data 14 a little at a time to the language monitor 15. The language monitor 15 passes the printing data to the printing device 4 via the port monitor 17, while monitoring the operating state of the printing device 4. For example, printing data is passed one page at a time to the printing device 4.

The port monitor 17 monitors the port from which printing data is transmitted to the printing device 4, and when the port is free, transmits the printing data. Printing data from the port monitor 17 is transmitted to the printing device 4 via the printer device driver 18, and finally is printed by the printing device 4. This flow of the printing task is performed primarily via the GDI32 (12), spooler 10, and language monitor 15.

(Replication of Print Command)

Next, the flow of printing in the first aspect of the invention is explained in detail. The client computer 3 incorporates a printing control program having functions to control the flow of processing to print data from the client computer 3 to the printing device 4. This printing control program operates as explained next. When the client computer 3 prints data displayed on the client display 8, printing is performed using a printing function of the running application program 11. At this time, a print command is output from the application program 11.

Figure 3:
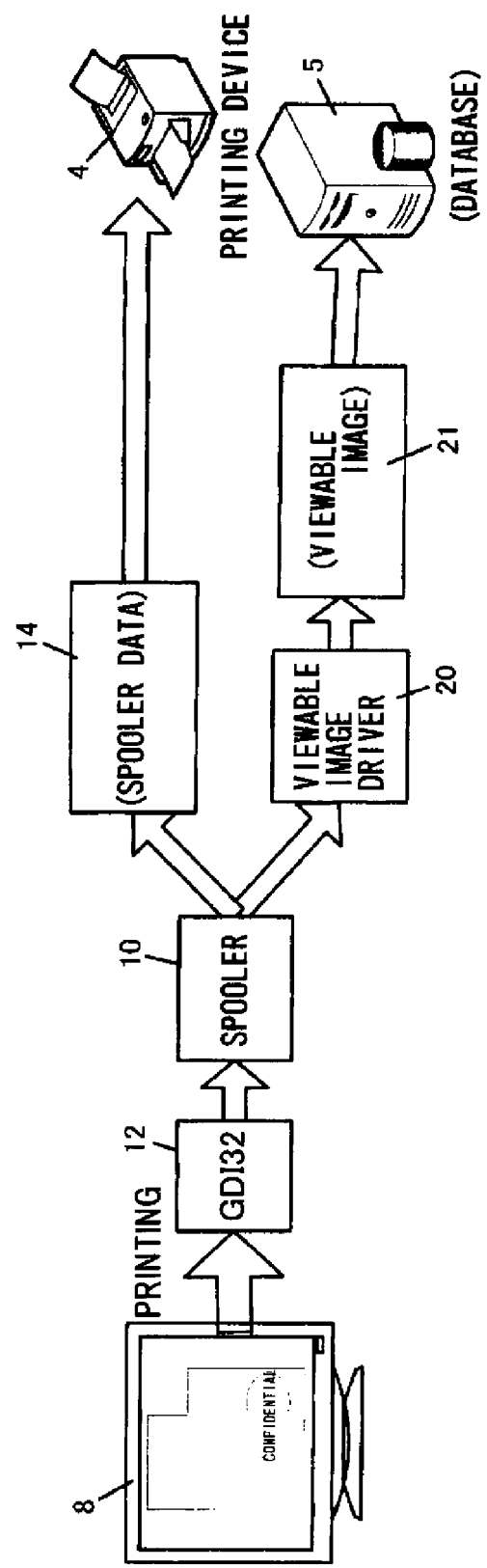
FIG. 3 shows in summary a procedure in which print commands are processed in an aspect.

FIG. 3 shows in summary the procedure for processing of the print command when the print command is output by the print control program of the first aspect of the invention. For example, when document data displayed on the client display 8 is to be printed, a print command is sent from the application program 11. The print command is processed as indicated by FIG. 2 and the explanation thereof, via the GDI32 (12) and spooler 10. The spooler 10 stores spooler data 14 on a hard disk, and transmits the data to the language monitor 15.

At this time, the printing control program detects the action of the spooler 10, temporarily halts the flow of printing processing, and controls printing. The printing control program replicates the spooler data 14 and passes the replicated spooler data 14 to the viewable image driver 20, and a viewable image 21 which can be displayed on the screens of ordinarily computers is generated.

The viewable image driver 20 is used to create viewable images 21, such as PDFs or similar. The viewable image driver 20 creates a viewable image 21 with the same content as the printing data to be printed on the printing device 4. The created viewable image 21 is transmitted to the server 5, and is stored in the database 7.

(Overall Flow)

Figure 4:
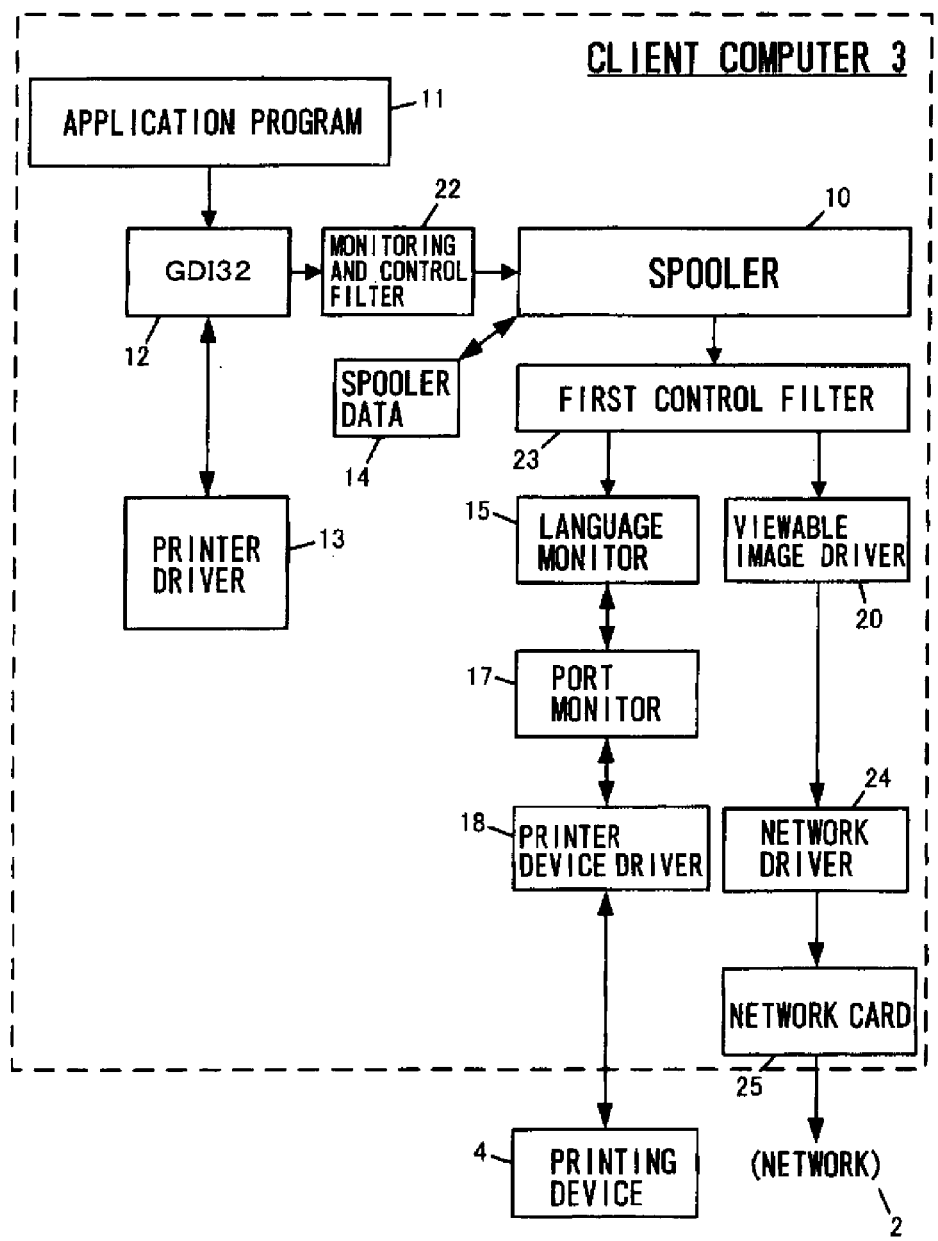
FIG. 4 shows the flow of printing control in a client computer 3.
Figure 5:
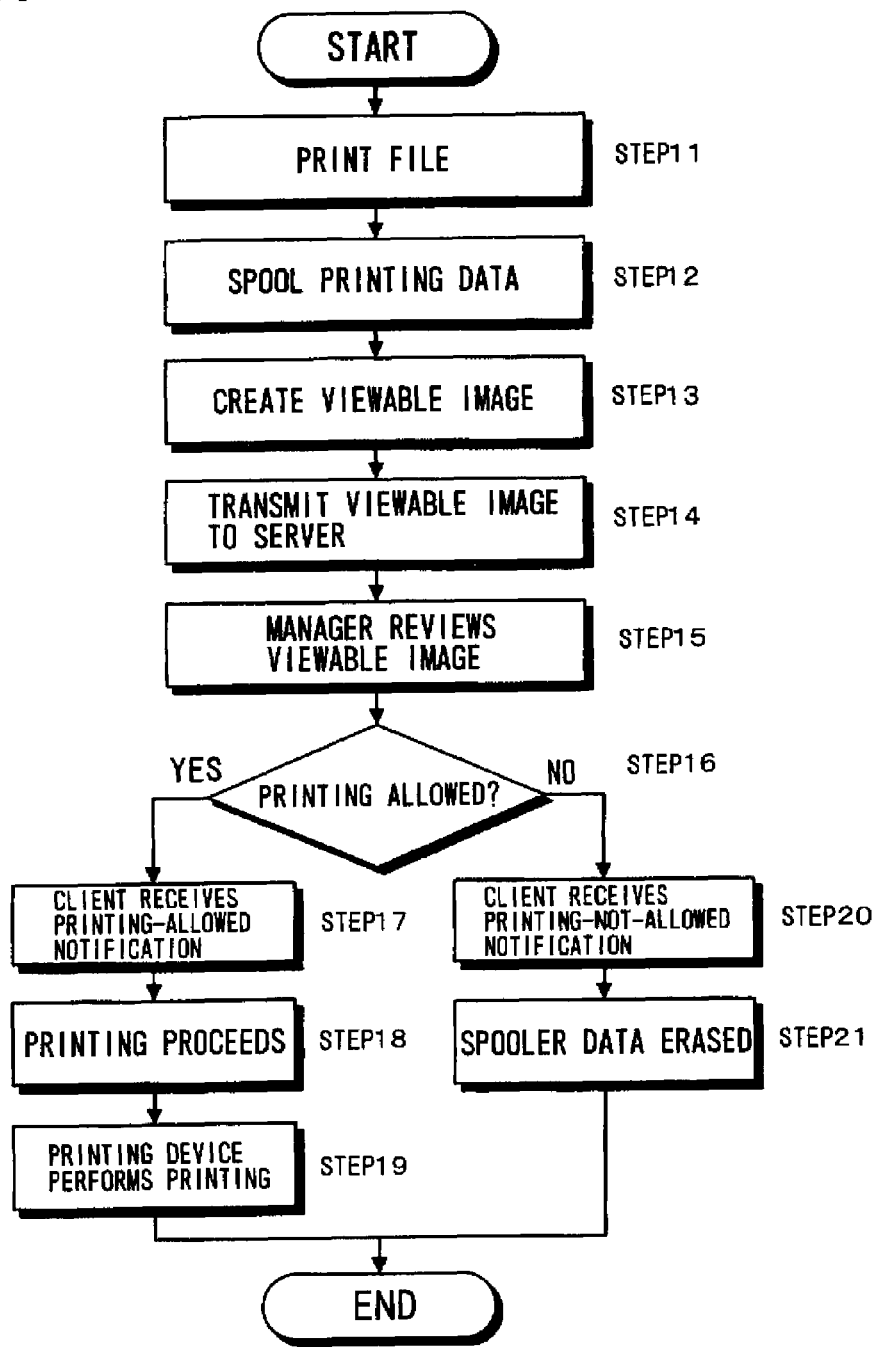
FIG. 5 is a flowchart showing overall operation of a printing control system 1.

FIG. 4 shows the flow of printing control in the client computer 3. FIG. 5 is a flowchart showing overall operation of the printing control system 1. The client issues a print command, from the client computer 3, to print a file from an application program 11 performing a task (step 11). The GDI32 (12) is called from the application program 11, and the file to be printed is passed to the GDI32 (12).

The GDI32 (12) creates printing data, and transmits the printing data to the spooler 10. The monitoring and control filter 22 is a portion of the printing control program, and is a program to detect operation of the spooler 10. The monitoring and control filter 22 has functions to detect operation of the spooler 10 and acquire the time of operation of the spooler 10, functions to acquire data spooled by the spooler 10, and similar.

Further, the monitoring and control filter 22 has functions to monitor operation of the application program 11. The monitoring and control filter 22 monitors CreateProcess operation, and when there is a process to be controlled, executes control to hook the process to be controlled to a module for control. That is, module code for the hook is copied to the address space of the process to be controlled, and is executed in the process context. This is performed by using such API functions as CreateProcess( ), WriteProcessMemory( ), CreateRemoteThread, and similar.

The monitoring and control filter 22 can also transmit to the first control filter 23 an announcement signal comprising detection results; the first control filter 23 can receive the announcement signal from the monitoring and control filter 22 and initiate operation. Printing data is spooled by the spooler 10, and is stored on a hard disk as spooler data 14 (step 12). When spooler data 14 is transmitted to the language monitor 15, the first control filter 23 detects this action, locks the spooler data 14, and temporarily halts printing.

Thereafter, the first control filter 23 replicates the spooler data 14 and transmits the spooler data 14 to the viewable image driver 20. The viewable image driver 20 uses the replicated spooler data 14 to create a viewable image 21 (see FIG. 3) such as a PDF or similar (step 13). The viewable image 21 has content similar to that of the printing data to be printed by the printing device 4.

The viewable image 21 is transmitted from the network driver 24 and network card 25 to the server 5 via the network 2 (step 14). The server 5 receives the viewable image transmitted from the client computer 3, and stores the data in the database 7 (see FIG. 1). The manager operates the manager computer 6 to reference the database 7 of the server 5 via the network 2 (step 15).

The manager references the viewable image in the database 7, and judges whether or not to perform printing from the client computer 3 to the printing device 4 (step 16). The judgment at this time is transmitted, as a notification signal, from the manager computer 6 directly to the client computer 3 or to the client computer 3 via the server 5. The notification signal which is the manager decision is transmitted from the manager computer 6 to the client computer 3, as a printing approval signal if printing is to be performed, or as a printing non-approval signal if printing is not to be performed.

The client computer 3, upon receiving a printing approval signal (step 17), causes printing to proceed (step 18), and transmits the spooler data 14 to the printing device 4. The printing device 4 receives the printing data transmitted from the client computer 3 and performs printing (step 19). The client computer 3, upon receiving a printing non-approval signal (step 20), erases the spooler data 14 from memory, and causes printing to be interrupted (step 21). The viewable image 21 can be an image file in gif, tiff, jpg, or another format, or a document file of a word processor such as Word (a registered trademark), Ichitaro (a registered trademark), or similar.

The notification signal of the decision on the manager computer 6 as to whether or not to allow printing by the client computer 3 is stored in the database 7. The client computer 3 regularly accesses the database 7, and can confirm the state of progress of printing requests. The notification signal of the decision made at the manager computer 6 as to whether or not to allow the client computer 3 to perform printing can also be transmitted directly to the client computer 3. These settings can be made freely by modifying the design of the database 7, client computer 3, manager computer 6, and server 5 of the printing control system 1.

As shown in FIG. 1, the printing device 4 is connected to the client computer 3. However, the printing device 4 can also be a network printer connected to the network 2, or a printer or photocopy machine connected to a printer server. In this case, the spooler 10 transmits data via the network driver 24 and network card 25 to the network printer or printer server connected to the network 2.

Figure 6:
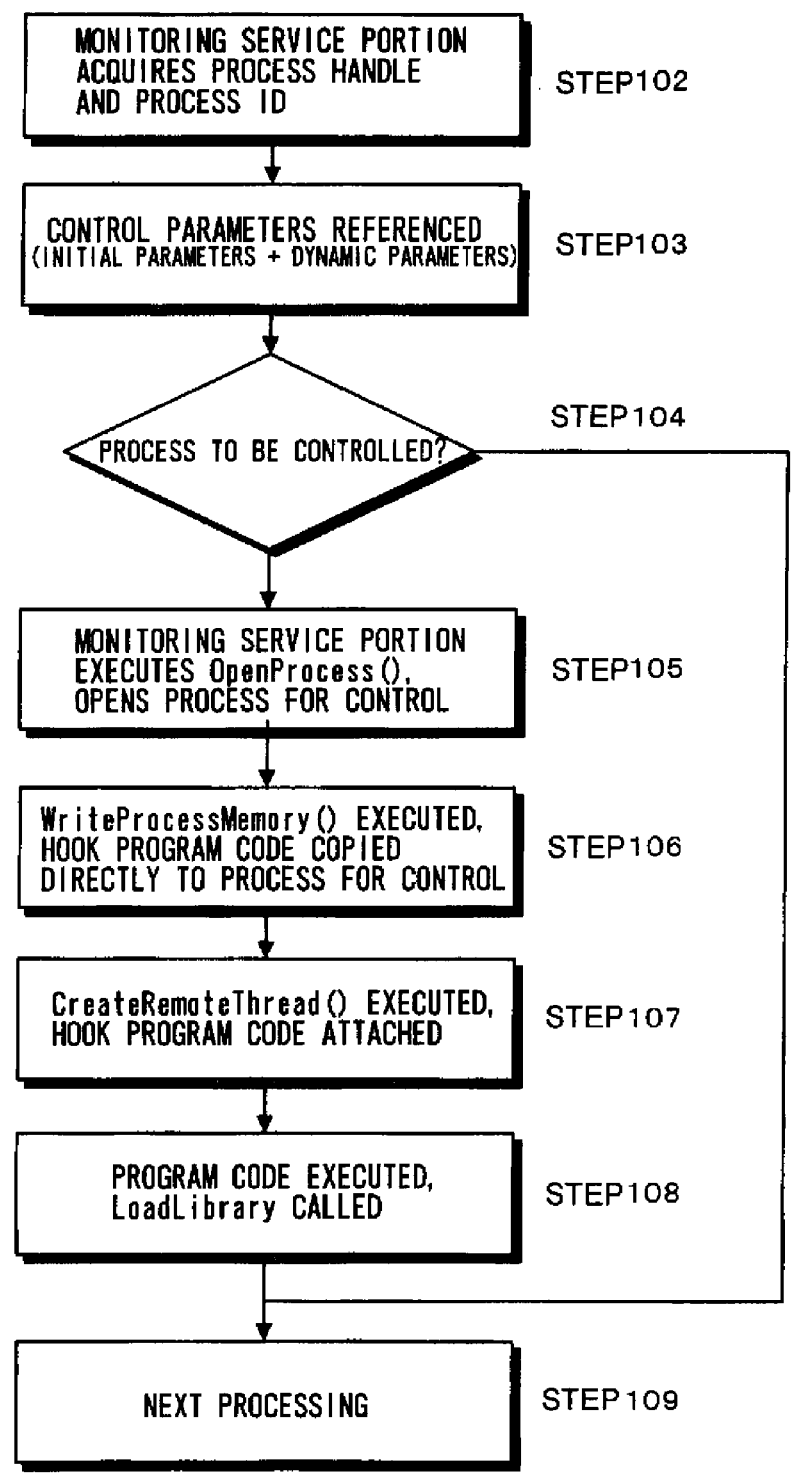
FIG. 6 is a flowchart showing an example of program hooking by the monitoring service portion of a monitoring and control filter.

FIG. 6 is a flowchart showing an example of execution of a program for hooking in the monitoring and control filter 22. In order to execute the program for hooking, a control module is hooked to the process to be controlled. The monitoring and control filter 22 comprises two modules, which are a monitoring service portion which monitors the process and hooks the control module, and a printing control portion to perform printing control through the hook program. When the monitoring service portion is initiated, control parameters are read. The control parameters comprise initial parameters stored in the client computer 3, and dynamic parameters received from the server 5.

The control parameters comprise specification of the application and process performing printing control, specification of the printing time, and specification of whether printing control is performed. Various conditions stored in the database 7 of the server 5 are further comprised. The monitoring service portion acquires the process ID of the application program 11 which is running (step 102).

The monitoring service portion acquires the process name from the acquired process ID. The monitoring service portion references the control parameters, compares the process name with control parameters, and determines whether the process is to be controlled (steps 103, 104). When the process is to be controlled, the monitoring service portion executes the OpenProcess( ) function for an existing process list, opens the process for control, and performs initialization process (step 105). The monitoring service portion then executes WriteProcessMemory( ) and directly copies the hook program code to the process to be controlled (step 106).

The monitoring service portion executes CreateRemoteThread( ), and attaches the hook program code so as to enable monitoring of the process newly generated from the existing process and monitoring of printing (step 107). This attachment causes the program code to be executed, the program code calls LoadLibrary, and the process newly generated from the existing process and the print execution hook program code can be executed by the monitoring service portion. The monitoring service portion then performs the next processing, such as to monitor the next process (step 109).

The hook program loaded by LoadLibrary is a program of the printing control portion of the monitoring and control filter 22, which performs printing control according to control parameter specifications and similar. The printing control portion of the monitoring and control filter 22 is used to described one example of controlling printing. The control module of the printing control portion is hooked to StartDocDlgW in the WinSpool driver. When StartDocDlgW operates, this control module is executed, and control parameters are referenced. For example, if the time period is not a time period in which printing is permitted, the control module forcibly ends StartDocDlgW and causes printing to fail. A log is created, and a mail slot is used to transmit the information to the printing control portion of the monitoring and control filter 22.

(Other Printing Control Methods)

Figure 7:
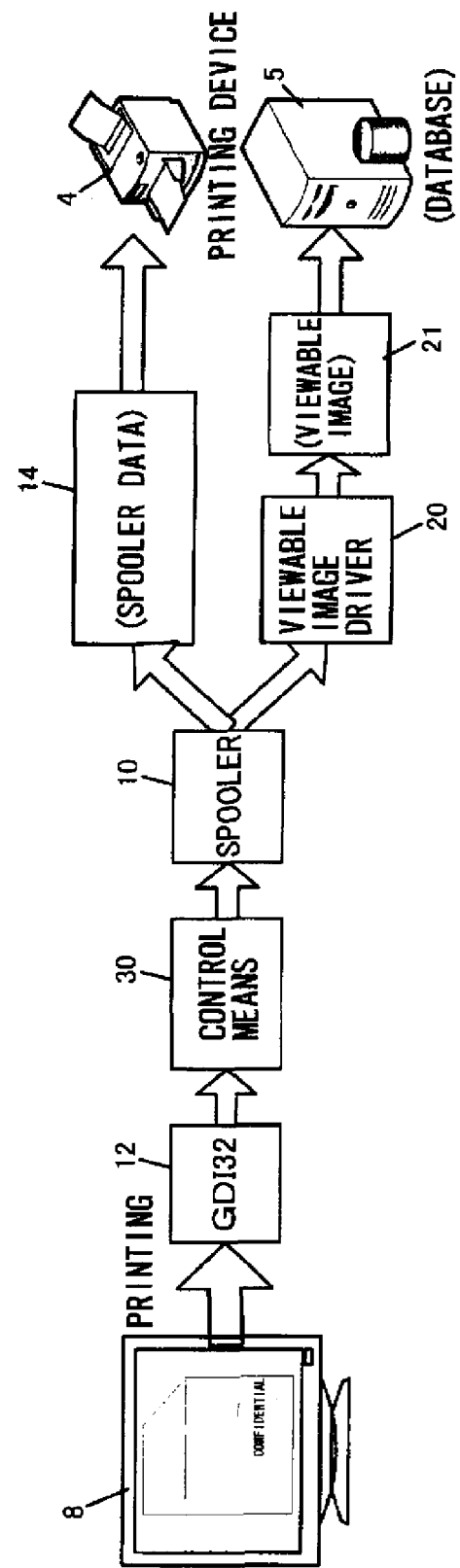
FIG. 7 shows in summary a procedure for printing control in which print commands are detected and are replicated; and, FIG. 8 is a functional block diagram showing in summary a second aspect of the invention, and is a block diagram showing in summary the functions when printing control is performed using a common interface driver.

FIG. 7 shows in summary a procedure to perform printing control by detecting and replicating print commands. When document data displayed on the client display 8 is to be printed, a print command is sent from the application program 11. The print command is processed via the GDI32 (12) and spooler 10 as indicated in FIG. 2 and the explanation thereof. That is, the printing control program has control means 30 positioned between the GDI32 (12) and spooler 10, which detects a print command and replicates the command.

The control means 30 operates when printing data is output from the GDI32 (12), the spooler 10 is called, and printing data is passed. The control means 30, upon detecting a print command, temporarily halts executing of the print command and printing data, and transmits the result of replication thereof to the spooler 10. The spooler 10 transmits the replicated print command and printing data to the viewable image driver 20.

In the procedure subsequent to this, steps 14 through 16 in FIG. 5 are executed. In steps 17 to 19, when in the client computer 3 a printing approval signal is received, the control means 30 resumes the print command and printing data which had been temporarily halted. As a result, printing is executed. In steps 20 and 21, when in the client computer 3 a printing non-approval signal is received, the control means 30 erases the temporarily halted print command and printing data.

The functions of the control means 30 are realized by providing the monitoring and control filter 22 of FIG. 4 with a function for temporarily halting execution of print commands and printing data, a function for transmitting copies of print commands and printing data to the spooler, a function for causing resumption of temporarily halted print commands and printing data, and a function for deleting print commands and printing data execution of which has been temporarily halted.

(Second Aspect)

Figure 8:
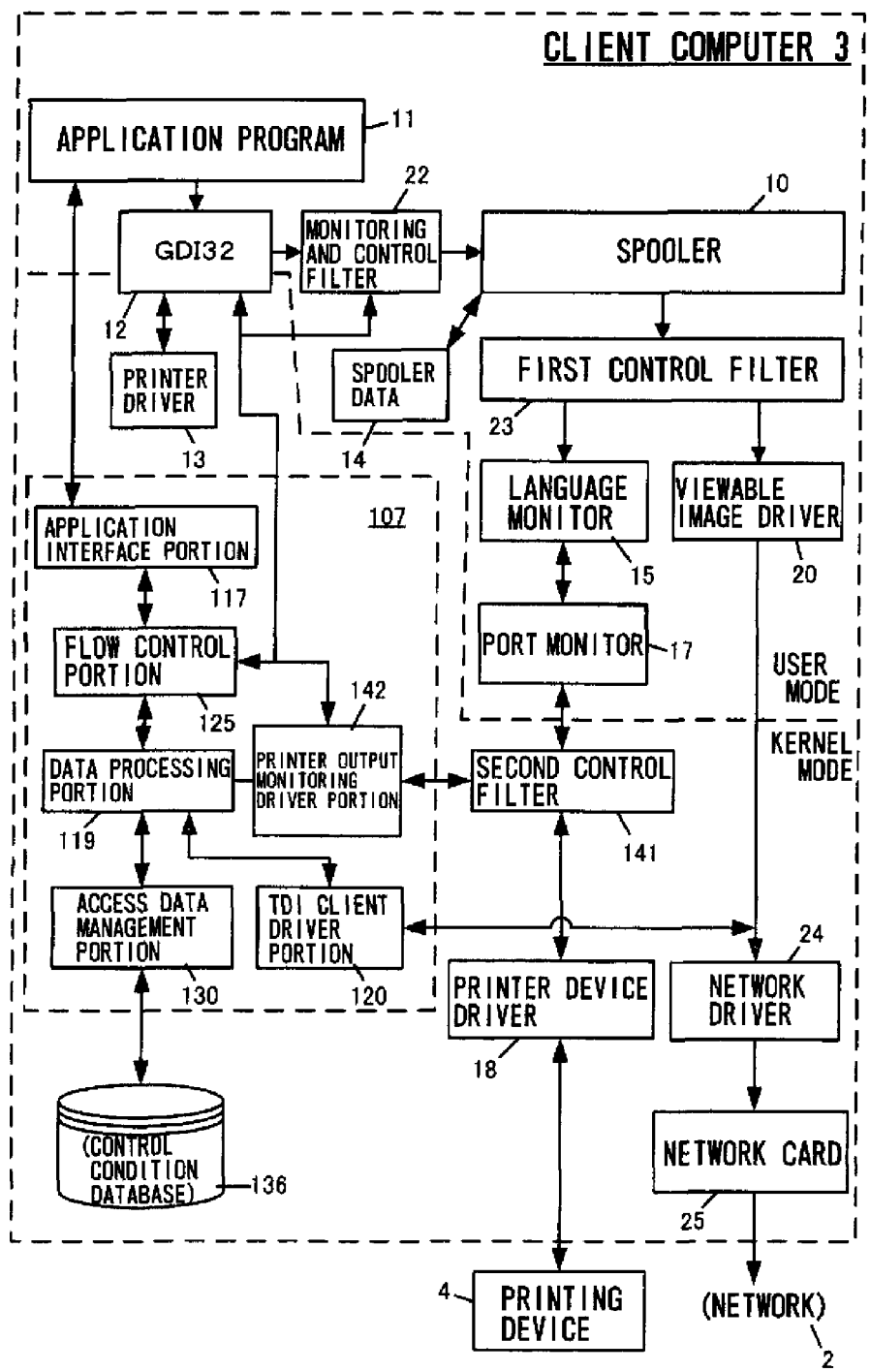

A second aspect of the invention is explained. FIG. 8 shows in summary the printing control system of the second aspect of the invention. FIG. 8 is a block diagram showing in summary a case in which printing control is performed using a common interface driver 107, monitoring and control filter 22, first control filter 23, and second control filter 141. In explaining the second aspect of the invention, the same symbols are used for portions which are the same as in the above-described first aspect of the invention, and explanations thereof are omitted. In the following, only portions differing from the first aspect of the invention are explained. Here, a summary of the second aspect is explained referring to FIG. 8. The common interface driver 107 is a driver which operates in kernel mode.

The common interface driver 107 provides a common interface with drivers operating in kernel mode to the application program 11 and other programs and services running in user mode. The common interface driver 107 also functions to provide a common interface enabling exchange of data between drivers operating in kernel mode. As the common interface driver 107, for example, the common interface driver 7 explained in Patent Document 1 can be used.

This common interface driver was proposed by these inventors, and is publicly known through International Patent Publication No. WO02/091195 and elsewhere, and moreover differs from the gist of this invention, and so an explanation of the details thereof is omitted. The common interface driver 107 comprises an application interface portion 117, flow control portion 125, data processing portion 119, TDI client driver portion 120, access data management portion 130, and printer output monitoring driver portion 142. The functions of these portions are as follows; details relating to printing control are disclosed in Patent Document 1.

The application interface portion 117 is an interface between the application program 11 and the common interface driver 107. The application interface portion 117 receives file access requests and other commands from the application program 11, and transmits to the application program 11 the command execution results, or other data received from the flow control portion 125. The data processing portion 119 performs input/output of data to and from the access data management portion 130 and TDI client driver portion 120.

The TDI client driver portion 120 is an interface between the network driver 24 and the common interface driver 107. The network driver 24 comprises a protocol driver (not shown) to control the communication protocol when transferring data to the network 2, and an NDIS (Network Driver Interface Specification) driver (not shown), which provides an interface between the protocol driver and the network card 25.

The network driver 24 controls the network card 25, and establishes a connection and controls the protocol when transferring data to the network 2. The TDI client driver portion 120 receives packet-encapsulated data from the data processing portion 119 and outputs the data to the protocol driver.

The flow control portion 125 analyzes commands and similar from the application program 11, received via the application interface portion 117, and performs control by issuing instructions to the data processing portion 119, printer output monitoring driver portion 142, and other modules. The access data management portion 130 is stored on a hard disk or in another auxiliary storage device, and references, registers, controls, and manages a control condition database 136 having information relating to user files.

The common interface driver 107 comprises a printer output monitoring driver portion 142. The printer output monitoring driver portion 142 monitors data output to the printing device 4, and controls output to the printing device 4 as necessary. The printer output monitoring driver portion 142 acquires a log of printer output to the printing device 4, as described below, and can store the log of the output to the printing device on a hard disk of the client computer 3, or can transmit the log via the network card 16 and network 2 to another computer for storage.

The printer output monitoring driver portion 142 controls output to the printing device 4 through control conditions, set in advance in the control condition database 136. For example, when a user attempts to print a specific file, this task may be constrained, interrupted, or halted. Or, printing data which a user is attempting to print may be replaced with other data which is printed. Or, control may be executed to greatly delay printing to the printing device 4.

Of course, notification signals relating to this control can be transmitted to the server 5. The client computer 3 can be accessed from the server 5 over the network 2, and the contents of the control condition database 136 modified, to modify or to interrupt/resume control of the printing device 4. The server 5 can also send commands to the flow control portion 125, and the flow control portion 125 can send instructions to the printer output monitoring driver portion 142 according to these commands, to control output to the printing device 4.

The data processing portion 119 has functions to create a log of printing based on information for the flow control portion 125 and printer output monitoring driver portion 142, and to store the log in the control condition database 136. This log is sent to the TDI client driver portion 120, and is transmitted to another computer connected to the network 2.

The second control filter 141 controls printing data transferred to the printing device according to print commands sent from the printer output monitoring driver portion 142. The second control filter 141 executes control to delete printing data, transmit printing data to the printing device 4 at an extremely slow speed, repeatedly transmit a portion of the data to be printed to the printing device 4, transmit blank pages to the printing device 4, and transmit printing data to the printing device 4 with watermarks added.

The monitoring and control filter 22 and the first control filter 23 operate under instructions from the common interface driver 107. As a result of this operation, when the client prints a specific file, the interface searches for conditions not input to the control condition database 136. When conditions for the file to be printed exist in the control condition database 136, the monitoring and control filter 22 and second control filter 141 operate to control the printing according to these conditions.

The control condition database 136 can include control conditions which confirm approval of a manager at all times when a specific file is to be printed. In this case, when printing the file, the monitoring and control filter 22 or first control filter 23 transmit a viewable image to the server 5, as shown in FIG. 7 and FIG. 3, and control printing according to a notification signal from the manager.

When conditions for a file to be printed are not present in the control condition database 136, a viewable image of the file to be printed is transmitted to the server 5, as shown in FIG. 3 and FIG. 7. Then, after receiving a notification signal transmitted from the server 5 or manager computer 6, printing control is performed.

The notification signal sent from the server 5 or manager computer 6 is received by the common interface driver 107 via the network 2, network card 25, and network driver 24, and can be transmitted to the monitoring and control filter 22 or to the first control filter 23. When performing control according to the notification signal, the first control filter 23 can receive notification signals either directly from the common interface driver 107, or via the monitoring and control filter 22.

INDUSTRIAL APPLICABILITY

When printing from a computer, this invention enables a manager to view the printed contents, control the printed data, and control printing. Consequently, by incorporating and using this invention in a management system in fields in which management of printed data is vital, such as for example where personal information, confidential government information, confidential corporate information and similar is managed, security can be enhanced, and management can be facilitated.

The invention claimed is:

1. A computer executing a control program operating when printing data is output to a printing device from a computer controlled by and operated by an operating system, the computer having: a monitoring and control filter for detecting a print command and output data output from an application program operating on said operating system to said printing device in order to perform printing and for controlling the output data; and a spooler for processing said output data to create said printing data, to temporarily save said created printing data in a storage medium, and for outputting said data to said printing device, said printing control program, when executed, causing the computer to perform operations comprising: said monitoring and control filter detects said print command, temporarily halts said print command and said output data, and replicates and transmits to said spooler said output data; said spooler processes said replicated output data and creates said printing data; a viewable image driver for creating a file which can be displayed on a screen uses said printing data output from said spooler to create a file which can be displayed on a screen; transmission means for transmission to a network transmitting said file to said network as to store in a database of a server connected to said network; said monitoring and control filter receives a notification signal transmitted from a manager who receives said file from said database via said network, views said file, and judges whether or not to perform printing using said printing device; and when said notification signal is a printing permission signal, said monitoring and control filter cancels said temporary halt to perform printing, but when said notification signal is a printing prohibition signal, said monitoring and control filter erases said temporarily halted print command and said output data to interrupt printing.

2. A non-transitory recording medium on which is recorded a printing control program, said non-transitory recording medium being recorded with the printing control program executed by the computer according to claim 1.

3. A computer executing a control program operating when printing data is output to a printing device from a computer controlled by and operated by an operating system, the computer having: a spooler for processing output data outputted, in order to perform printing on said printing device, from said application program operating on said operating system, to create said printing data, and temporarily storing said created printing data in a storage medium; and a first control filter for controlling said printing data, said priming control program, when executed, causing the computer to perform operations comprising: said first control filter detects said printing data output from said spooler, temporarily halts said printing task, and replicates said printing data; a viewable image driver for creating a file which can be displayed on a screen uses said replicated printing data to create a file which can be displayed on a screen; transmission means for transmission to a network, transmitting said file to said network as to store in a database of a server connected to said network; said first control filter receives a notification signal transmitted from a manager who receives said file from said database via said network, views said file, and judges whether or not to perform printing using said printing device; and when said notification signal is a printing permission signal, said first control filter cancels said temporary halt to perform printing, but when said notification signal is a printing prohibition signal, said first control filter erases said temporarily halted printing data to interrupt printing.

4. A computer executing a control program operating when printing data is output to a printing device from a computer controlled by and operated by an operating system, the computer having: a monitoring and control filter for detecting print commands and output data, output from an application program operating on said operating system in order to perform printing to said printing device; a spooler for processing said output data to create said printing data and temporarily saving said created printing data in a storage medium and outputting said data to said printing device; and a first control filter for controlling said printing data, said printing control program, when executed, causing the computer to perform operations, comprising: said monitoring and control filter detects said print command; said spooler processes said output data, creates said printing data, and temporarily stores said created printing data in a storage medium; said first control filter detects said printing data output from said spooler, temporarily halts said printing task, and replicates said printing data; a viewable image driver for creating a file which can be displayed on a screen uses said replicated data to create a file which can be displayed on a screen; transmission means for transmission to a network transmit said file to said network as to store in a database of a server connected to said network; said monitoring and control filter receives a notification signal transmitted from a manager who receives said file from said database via said network, views said file, and judges whether or not to perform printing using said printing device; said monitoring and control filter transmits said notification signal to said first control filter; and when said notification signal is a printing permission signal, said first control filter cancels said temporary halt to perform printing, but when said notification signal is a printing prohibition signal, said first control filter erases said temporarily halted printing data to interrupt printing.

* * * * *

UNITED STATES PATENT AND TRADEMARK OFFICE
CERTIFICATE OF CORRECTION

PATENT NO. : 8,564,807 B2
APPLICATION NO. : 11/910119
DATED : October 22, 2013
INVENTOR(S) : Shoji et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1787 days.

Signed and Sealed this
Fifteenth Day of September, 2015

Michelle K. Lee
*Director of the United States Patent and Trademark Office*